UNITED STATES PATENT OFFICE.

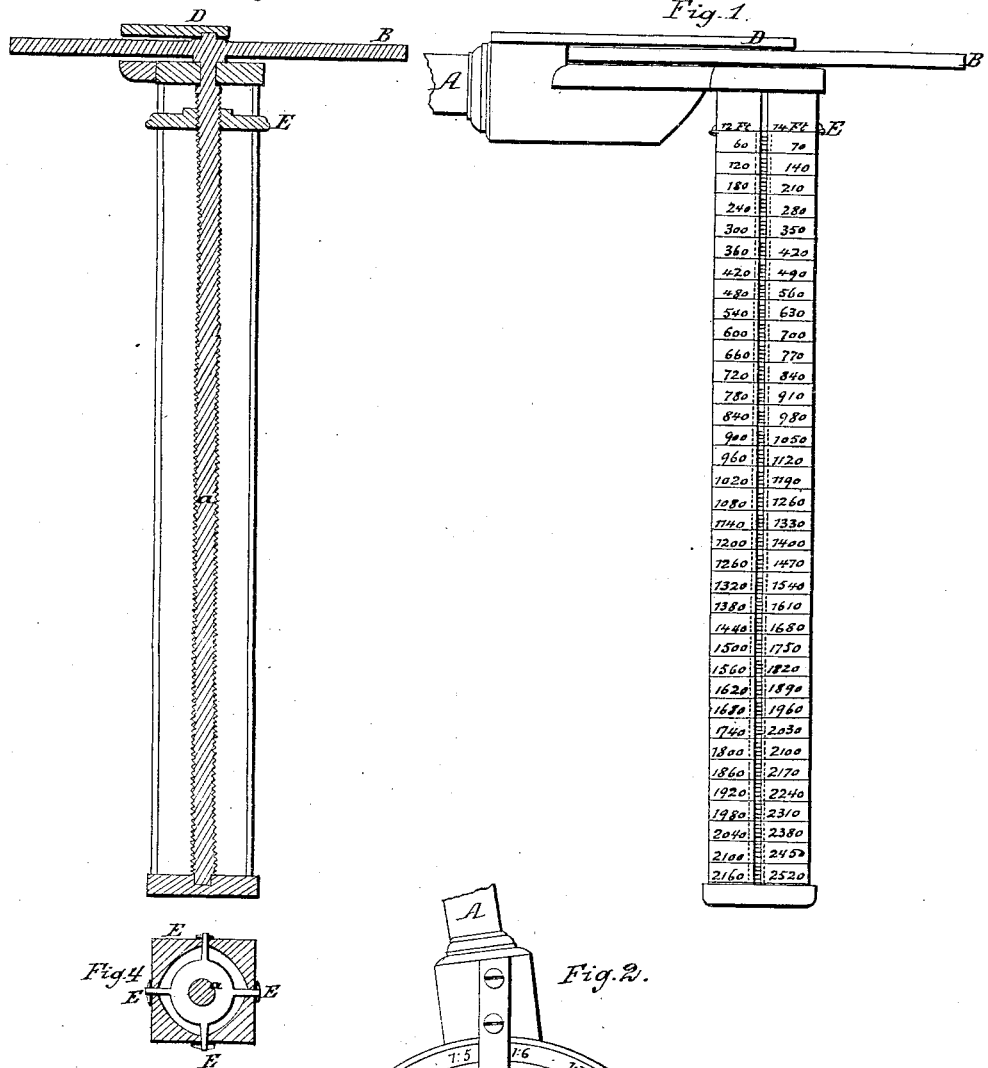

AUSTIN D. HOFFMAN, OF BELLEVILLE, MICHIGAN.

IMPROVEMENT IN BOARD-MEASURES.

Specification forming part of Letters Patent No. 37,755, dated February 24, 1863.

*To all whom it may concern:*

Be it known that I, AUSTIN D. HOFFMAN, of the county of Wayne and State of Michigan, have invented a new and useful improved board-measure, for ascertaining the number of feet in a lot of lumber varying in length from six to twenty feet long, simply by rolling the instrument across the board or piece of lumber to be measured, the instrument being capable of measuring and keeping tally of the several lengths of lumber, as above described; and I do hereby declare that the following is a full, clear, and exact description of the construction and operation of the same, reference being had to the annexed drawings, making a part of this specification.

In the accompanying drawings, Figure 1 is a top view of my board-measure, the handle A being broken away. Fig. 2 is a face view of the dial-wheel with eight circles graduated thereon. Fig. 3 is a longitudinal section through the center of the scale and the screw-shaft, showing also the traveling index. Fig. 4 is a transverse section of the scale and central screw-shaft.

In a board-measure constructed on my plan the number of scales may be varied, but I usually employ about eight scales. The rule has four faces, as seen in Figs. 1 and 4, each face having two scales, as seen in Fig. 1. The four faces of the rule are all graduated alike, but the columns of figures or numbers in the different scales are varied to correspond to different lengths of boards. Two of these different scales are seen upon the face of rule seen in Fig. 1. The left-hand column of numbers corresponds to a board or timber twelve feet long, and the right-hand column to one of fourteen feet long. The other faces of the rule have columns of numbers corresponding to other lengths of lumber, so that the four sides of the rule will give eight scales or columns of numbers from six to twenty feet. The face of the dial-wheel B is also graduated with eight scales on eight different circles, as seen in Fig. 2, corresponding to the eight different scales on the rule above described. The outer one of these circles is graduated into twenty equal parts, and corresponds to the scale intended to measure lumber of twenty feet in length. The inner and smallest circle is graduated into six equal parts, and is intended to measure lumber six feet long. This dial-wheel B is fixed upon the screw-shaft or axle *a*, Fig. 3, so that the wheel and shaft turn together, and upon the screw-shaft *a* is a nut having four pointers or indices, E, corresponding to the eight scales, as best seen in Fig. 4, the nut forming a common center to all the four indices. As the wheel B and screw-shaft or axle *a* are revolved, the nut and indices E are pushed along by the screw, and the distance the indices are moved is seen upon the scales of the rule above described.

The operation of my board-measure is as follows: The length of a board being known—say twenty feet—and the indices E being at the head of the columns of numbers, as shown in Fig. 1, the wheel B should be brought so that index D shall point at figure 20 on wheel B, the point being the commencement or null point of the circle on the wheel. Then place the wheel B upon the board in position to roll across the latter, and bring index D over the edge of the board. Now, roll the wheel B across the board until index D stands over the other edge of the same. As the wheel B rolls forward the index D marks the graduations upon the outer circle, the first graduation or division, 1, indicating one foot, and the whole circle twenty feet in the board twenty feet long, as above assumed. If the stock of boards be twelve feet long, then the circle corresponding to the figures 12 on index D is to be observed, each division on said circle marking one foot, and the whole rotation of the wheel indicating twelve feet. Five rotations or complete revolutions of the wheel B will push the indices E along the scale, Fig. 1, just the distance of one division, and thus five rotations would equal sixty feet of lumber, as marked upon the left hand in Fig. 1. Ten revolutions of the wheel B will bring the index E to the second line of graduation, marked 120 on the left hand in Fig. 1. Thus the revolutions of wheel B are recorded by the index E, and the column of figures on each scale shows the number of feet measured, according to the length of lumber. For any length of lumber from six to twenty the above measure is self-recording. When index E reaches the bottom of the column of figures, the amount may be noted, and the measure brought to its original position with index E at null on the scale, Fig. 1.

I am aware that wheels have been employed in board-measures; but I believe my construction of measure is new and a great improvement.

Having thus fully described my invention, what I claim, and desire to secure by Letters Patent of the United States, is—

The dial-wheel B, having several circles differently graduated, in combination with the indices E and several scales or columns of figures, all arranged to measure different lengths of lumber, substantially in the manner and for the purpose set forth.

AUSTIN D. HOFFMAN.

Witnesses:
JOHN BOYCE,
EDWARD MCINTOSH.